(12) United States Patent
Lee et al.

(10) Patent No.: US 11,227,479 B2
(45) Date of Patent: Jan. 18, 2022

(54) SENSING DEVICE FOR SENSING OPEN-OR-CLOSED STATE OF DOOR AND METHOD FOR CONTROLLING THE SAME

(71) Applicant: Samsung Electronics Co., Ltd., Gyeonggi-do (KR)

(72) Inventors: Chan Won Lee, Gyeonggi-do (KR); Yong Wook Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/650,138

(22) PCT Filed: Oct. 29, 2018

(86) PCT No.: PCT/KR2018/012893
§ 371 (c)(1),
(2) Date: Mar. 24, 2020

(87) PCT Pub. No.: WO2019/088610
PCT Pub. Date: May 9, 2019

(65) Prior Publication Data
US 2021/0192924 A1     Jun. 24, 2021

(30) Foreign Application Priority Data

Nov. 3, 2017   (KR) .......................... 10-2017-0146251

(51) Int. Cl.
| | |
|---|---|
| *G08B 21/22* | (2006.01) |
| *G08B 13/08* | (2006.01) |
| *G08B 25/00* | (2006.01) |
| *G08B 29/18* | (2006.01) |
| *H04L 12/28* | (2006.01) |

(52) U.S. Cl.
CPC ............. *G08B 21/22* (2013.01); *G08B 13/08* (2013.01); *G08B 25/001* (2013.01); *G08B 29/183* (2013.01); *H04L 12/2803* (2013.01)

(58) Field of Classification Search
CPC ...... G08B 21/22; G08B 13/08; G08B 29/183; G08B 25/001; H04L 12/2803
USPC ....................................... 340/573.1
See application file for complete search history.

(56) References Cited

U.S. PATENT DOCUMENTS

| | | | |
|---|---|---|---|
| 6,919,918 B2* | 7/2005 | Carretero Guerrero | G07C 9/37 348/156 |
| 9,245,439 B2* | 1/2016 | Lamb | G08B 13/02 |
| 9,852,594 B2 | 12/2017 | Kim et al. | |

(Continued)

FOREIGN PATENT DOCUMENTS

| | | |
|---|---|---|
| EP | 1772833 A1 | 4/2007 |
| JP | 2017-143658 A | 8/2017 |

(Continued)

OTHER PUBLICATIONS

European Search Report dated Oct. 1, 2020.
European Search Report dated Dec. 14, 2020.

*Primary Examiner* — John A Tweel, Jr.
(74) *Attorney, Agent, or Firm* — Cha & Reiter, LLC

(57) ABSTRACT

Disclosed is an electronic device comprising: a communication circuit, at least one sensor for sensing an open-or-closed state of a door and a person near the door, a processor electrically connected to the communication circuit and the at least one sensor, and a memory electrically connected to the processor.

15 Claims, 9 Drawing Sheets

(56) References Cited

U.S. PATENT DOCUMENTS

| | | | |
|---|---|---|---|
| 10,497,230 B2 | 12/2019 | Lamb et al. | |
| 2008/0061970 A1 | 3/2008 | Imai et al. | |
| 2008/0068162 A1 | 3/2008 | Sharma et al. | |
| 2008/0157964 A1* | 7/2008 | Eskildsen | G08B 29/188 340/545.1 |
| 2010/0164683 A1 | 7/2010 | Sharma et al. | |
| 2016/0232762 A1 | 8/2016 | Westman et al. | |
| 2016/0247370 A1 | 8/2016 | Lamb et al. | |
| 2017/0138762 A1 | 5/2017 | Jiang | |
| 2017/0156028 A1 | 6/2017 | Kim et al. | |

FOREIGN PATENT DOCUMENTS

| | | |
|---|---|---|
| KR | 2003-0017031 A | 3/2003 |
| KR | 10-2006-0024020 A | 3/2006 |
| KR | 10-2015-0136226 A | 12/2015 |
| KR | 10-2017-0006120 A | 1/2017 |
| KR | 10-2017-0066839 A | 6/2017 |
| WO | 2008-0311191 A1 | 3/2008 |

* cited by examiner

SENSING DEVICE FOR SENSING OPEN-OR-CLOSED STATE OF DOOR AND METHOD FOR CONTROLLING THE SAME

CLAIM OF PRIORITY

This application is a National Phase Entry of PCT International Application No. PCT/KR2018/012893, which was filed on Oct. 29, 2018, and claims a priority to Korean Patent Application No. 10-2017-0146251, which was filed on Nov. 3, 2017, the contents of which are incorporated herein by reference.

TECHNICAL FIELD

Embodiments disclosed in the disclosure relate to technologies for sensing the open/closed state of a door.

BACKGROUND ART

Demands for home networking technologies of providing a necessary service to a user depending on the states of things present inside a house. An electronic device installed for home networking may sense the state of a thing using a sensor and may provide a necessary service to a user depending on the sensed state.

In particular, the home networking for security may sense the state of the door in a house, or may provide the sensed state to the user or a security company. Accordingly, the home networking for security may provide the security service to the user.

DISCLOSURE

Technical Problem

Although the electronic device for the home networking provides a service to a user depending on the state of a thing sensed through the sensor, the information on the state of the thing, which is able to obtained through various sensors, is limited. Accordingly, there is a limitation even in a service to be provided to the user based on the obtained information.

In addition, although the electronic device may determine the state of the thing through a camera to obtain the information on the states of more many things, the camera has to be installed to obtain the images of the things.

In addition, the processing procedure of analyzing the obtained images through the camera is complex, so the service may not be rapidly provided to the user.

Various embodiments of the disclosure may provide various services based on the sensed state, by sensing a human close to a thing to sense not only the open/closed state of the door, but also the position in which the door is open.

Technical Solution

According to an embodiment disclosed in the disclosure, an electronic device installed in a door may include a communication circuit, at least one sensor to sense an open/closed state of the door and a human close to the door, a processor electrically connected with the communication circuit and the at least one sensor, and a memory electrically connected with the processor. An instruction, which is stored in the memory, may cause the processor to, when executed, sense the open state of the door through the at least one sensor, sense a human positioned at least one of an inside and an outside of a space in which the door is provided, through the at least one sensor, determine whether the door is opened from the outside or at the inside of the space, based on the sensed open state of the door and the sensed position of the door, and transmit the specified information to an external device based on a position at which the door is opened, through the communication circuit.

In addition, according to an embodiment of the disclosure, an electronic device installed in a window may include a communication circuit, at least one sensor to sense an open/closed state of the window and a human close to the window, a processor electrically connected with the communication circuit and the at least one sensor, and a memory electrically connected with the processor. An instruction stored in the memory may cause the processor to, when executed, sense the open state of the window through the at least one sensor, sense a human positioned in at least one of an inside and an outside of a space in which the window is provided, through the at least one sensor, determine whether the window is open at the outside or at the inside of the space, based on the sensed open state of the window and the sensed position of the window, and transmit the specified information to an external device based on a position at which the window is open, through the communication circuit.

In addition, according to an embodiment disclosed in the disclosure, a method for controlling an electronic device may include sensing an open state of a door, sensing a human close to the door and positioned in at least one of an inside and an outside of a space in which the door is provided, determining whether the door is opened from the outside or at the inside of the space, based on the sensed open state of the door and the sensed position of the door, and transmitting specified information to an external device, based on a position at which the door is open.

Advantageous Effects

According to embodiments disclosed in the disclosure, the electronic device may provide, to the user, various services to transmit only necessary information to the user and to control the state of a household Internet of Things (IoT) device depending on the determined state.

Besides, a variety of effects directly or indirectly understood through the disclosure may be provided.

DESCRIPTION OF DRAWING

In the following description made with respect to the accompanying drawings, similar components will be assigned with similar reference numerals.

MODE FOR INVENTION

Hereinafter, various embodiments of the disclosure may be described with reference to accompanying drawings. However, those of ordinary skill in the art will understand that the disclosure is not limited to a specific embodiment, and modifications, equivalents, and/or alternatives on the various embodiments described herein can be variously made without departing from the scope and spirit of the disclosure.

Figure 1:
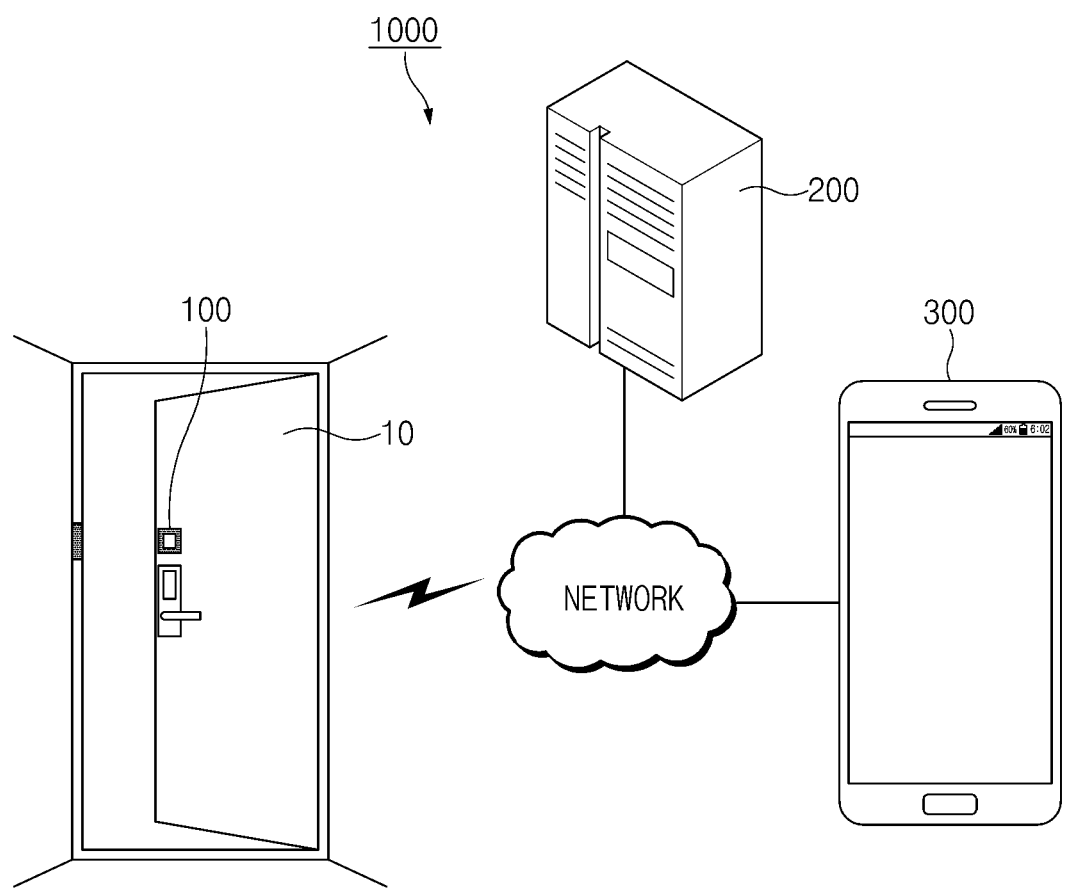
FIG. 1 is a view illustrating a system of sensing opening of a door, according to various embodiments of the disclosure.

FIG. 1 is a view illustrating a system of sensing opening of a door, according to various embodiments of the disclosure.

Referring to FIG. 1, a door opening sensing system 1000 may include an electronic device (or sensor device) 100, a server 200, and an external device 300.

According to an embodiment, the electronic device 100 may be installed on a door 10. For example, the electronic device 100 may be installed on at least one of an inner surface and an outer surface of the door 10. The inner surface may be a surface positioned at the inside of a space (e.g., a house) in which the door 10 is installed in the state that the door 10 is closed, and the outer surface may be a surface positioned at the outside of the space. The door 10 may, for example be opened by a human positioned at the inside or outside of the space. In other words, the door 10 may be opened from inside or outside of the specified space. According to an embodiment, the electronic device 100 may sense a state of the installed door 10.

According to an embodiment, the electronic device 100 may sense the open/closed state of the door 10. According to an embodiment, the electronic device 100 may sense the position of a human close to the door 10. For example, the electronic device 100 may sense a human positioned at the inside or outside of the space to open the door 10. According to an embodiment, the electronic device 100 may transmit information on the sensed state of the door 10 to the server 200.

According to an embodiment, the server 200 may receive information on the state of the door 10. For example, the server 200 may receive information on the open state of the door 10 and information on the sensed position of the human, from the electronic device 100. According to an embodiment, the server 200 may determine a position at which the door 10 is opened, based on the received information on the state of the door 10. For example, the server 200 may determine whether the door 10 is opened from the inside or outside of the space, based on the information on the open state of the door 10 and the sensed position of the human.

According to an embodiment, the server 200 may transmit the specified information to the external device 300, based on the position at which the door 10 is opened. For example, when it is determined that the door 10 is opened from the outside, the server 200 may transmit the specified information to the external device 300. The specified information may include, for example, information on a state in which the door 10 is opened. The specified information may include, for example, alarm information for notifying an external intrusion.

According to an embodiment, the external device 300 may receive the specified information to be provided to the user. For example, the external device 300 may display information on that the door 10 is opened from the outside, to be provided to the user. For another example, the external device 300 may provide, to the user, the alarm information for notifying the external intrusion.

According to an embodiment, the electronic device 100 may provide, to the user, the state information of the door 10 depending on the set condition. When the electronic device 100 senses only an open/closed state of the door 10 and provides information on the open state of the door 10 to the user, unnecessary information may be provided to the user. For example, the case that the door 10 is opened from the outside may indicate the visiting or the intrusion of an outsider. Accordingly, the information on the open state of the door 10 may need to be provided to the user. The case that the door 10 is opened from the inside may indicate going out of an insider (e.g., family). Accordingly, the information on the open state of the door 10 may not need to be provided to the user. Therefore, according to various embodiments of the disclosure, the electronic device 100 may determine the position that the door 10 is opened and may selectively provide, to the user, the information on the state of the door 10.

Figure 2:
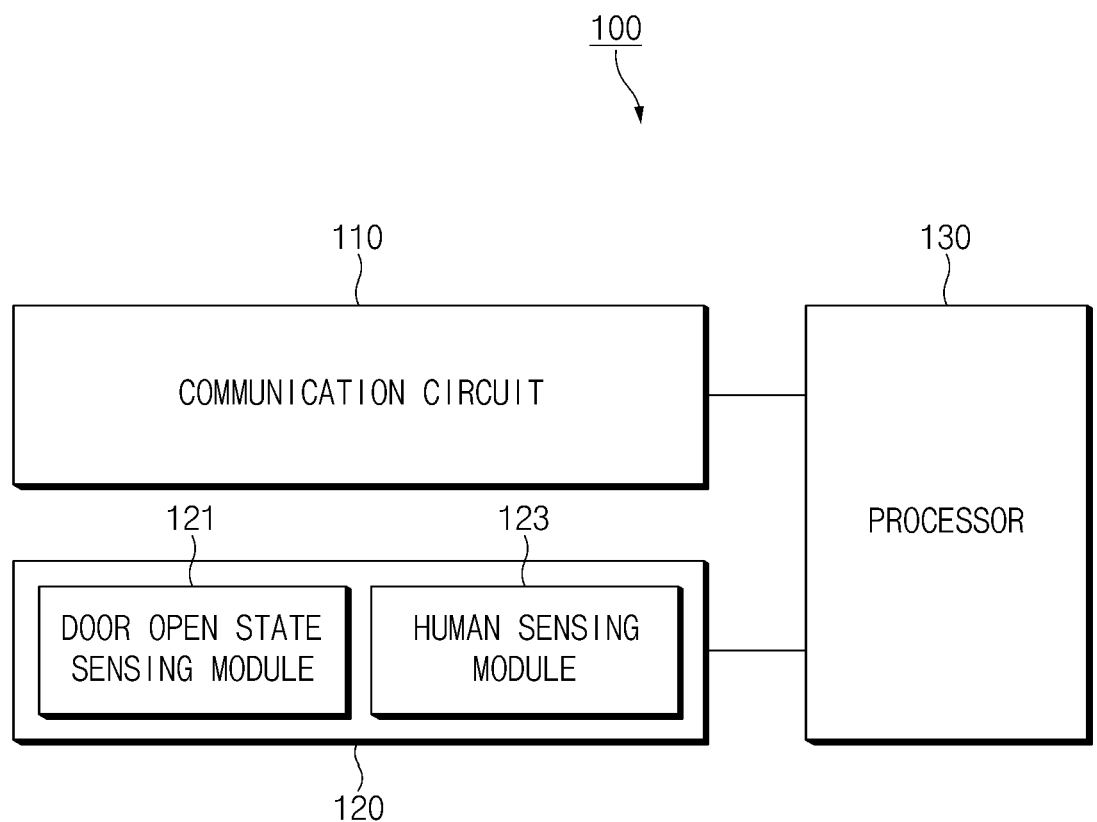
FIG. 2 is a block diagram illustrating a configuration of an electronic device, according to various embodiments of the disclosure.

FIG. 2 is a block diagram illustrating a configuration of an electronic device, according to various embodiments.

Referring to FIG. 2, the electronic device 100 may sense the state of the door (e.g., the door 10 of FIG. 1).

According to an embodiment, the electronic device 100 may include a communication circuit 110, a sensor 120, and a processor 130. In addition, the electronic device 100 may further include a memory in which an instruction for controlling the operation of the processor 130 is stored.

The communication circuit 110 may be connected with an external device to transmit and receive data. For example, the communication circuit 110 may be connected with the external device to transmit or receive data through a wired communication network (e.g., a cable network, a public switched telephone network (PSTN)) or a wireless communication network (e.g., code division multiple access (CDMA), wideband code division multiple access (WCDMA), a global system for mobile communications (GSM), an evolved packet core (EPC), or a long term evolution (LTE)).

The sensor 120 may collect data for sensing a state of the door. For example, the sensor 120 may collect data for sensing an open state of the door and a human close to the door. According to an embodiment, the sensor 120 may include a door open state sensing module 121 and a human sensing module 123.

According to an embodiment, the door open state sensing module 121 may collect data for sensing the open state of the door. For example, the door open state sensing module 121 may collect data for determining an open/closed state of the door. In addition, the door open state sensing module 121 may collect data for sensing the movement and position of the door. According to an embodiment, the door open state sensing module 121 may include a sensor to sense data for sensing the open state of the door. For example, the door open state sensing module 121 may include a magnetic sensor to sense data for determining an open/closed state of the door. In addition, the door open state sensing module 121 may include an acceleration sensor to sense the movement of the door and a gyro sensor (e.g., 6-axis gyro sensor) to detect the position of the door.

According to an embodiment, the human sensing module 123 may collect data for sensing a human close to the door. For example, the human sensing module 123 may collect data for sensing at least one of a body and a movement of the human. In addition, the human sensing module 123 may collect data for sensing a human positioned in at least one of the inside and the outside of the space to open the door. According to an embodiment, the human sensing module 123 may include a sensor to sense data for sensing a human close to the door. For example, the human sensing module 123 may include at least one of an infrared (IR) sensor, a passive infrared (PIR) sensor, and an ultrasonic sensor to sense a human close to the door.

The processor 130 may control the overall operation of the electronic device 100. According to an embodiment, the processor 130 may be electrically connected with the communication circuit 110 and the sensor 120. According to an embodiment, when the instruction stored in the memory is executed, the processor 130 is caused to perform the following operation.

According to an embodiment, the processor 130 may sense the open state of the door through the sensor 120 (e.g., the door open state sensing module 121).

According to an embodiment, the processor 130 may sense (or recognize) a human positioned in at least one of the inside and the outside of the space in which the door is provided, through the sensor 120 (e.g., the human sensing module 123).

According to an embodiment, the human sensing module 123 may sense only a human positioned at the inside (or outside) to open the door through the human sensing module 123, when the electronic device 100 is installed on the inner surface (or the outer surface) of the door 10. In other words, the processor 130 may not directly sense the human positioned at the outside (or the inside) of the door 10 through the human sensing module 123. According to an embodiment, the processor 130 may sense that a human is positioned at the outside (or the inside) of the space, when the door 10 is in an open state, and when the human close to the door 10 is not directly sensed. In other words, the processor 130 may indirectly sense the human positioned at the outside (or the inside) of the door 10. Accordingly, although the electronic device 100 is installed only on the inner surface (or the outer surface) of the door 10, the processor 130 may sense (or recognize) all humans positioned inside or outside the space to open the door 10. According to an embodiment, the electronic device 100 may be protected from the risk of theft, when the electronic device 100 is installed on the inner surface of the door 10.

According to another embodiment, when the electronic device 100 is installed on all the inner surface and the outer surface of the door 10, the processor 130 may sense a plurality of humans positioned at the inside or outside of the space through the human sensing module 123. In other words, the processor 130 may directly sense the plurality of humans at both the inside and the outside of the space through the human sensing module 123. Accordingly, the processor 130 may recognize a situation in which a plurality of humans (e.g., delivery persons to deliver goods) are close to the door 10 at the inside and outside of the space, and may provide, to the user, necessary information based on the recognized situation.

According to an embodiment, the processor 130 may transmit the state information of the door to the server (e.g., the server 200 of FIG. 1) through the communication circuit 110. According to an embodiment, the server may determine a position at which the door is opened, based on the received state information of the door. For example, the server may determine the position at which the door is opened, based on the sensed open state of the door and the sensed position of the sensed human.

According to another embodiment, the processor 130 may determine the position at which the door is opened, based on the sensed state information of the door. For example, the processor 130 may directly determine the position at which the door is opened, based on the sensed open state of the door and the sensed position of the human without passing through the server.

According to an embodiment, the server (or the processor 130) may determine that the door is opened from the outside, when the state of the door is the open state and when the human is sensed at the outside the space. According to an embodiment, the server (or the processor 130) may determine that the door is opened from the inside, when the state of the door is the open state and a human positioned inside the space is sensed, According to an embodiment, the server (or the processor 130) may determine the position at which the door is opened, by sensing a human close to the door after the door is closed, when the state of the door is the open state and the humans are sensed at the inside and outside the space. For example, when a human is sensed at the inside of a close space after closing the door, the server may determine the door as being opened from the inside. For another example, when a human is sensed at the outside of the space close to the door is sensed after closing the door, the server may determine the door as being open outside.

According to an embodiment, the server (or the processor 130) may transmit the specified information to the external device, based on the position at which the door is opened. For example, when the door is determined as being opened from the outside, the server may transmit the specified information to the external device. The specified information may include, for example, information on a state in which the door 10 is opened from the outside. The specified information may include, for another example, alarm information for notifying an external intrusion. For example, when the door is determined as being opened from the inside, the server may not transmit the specified information to the external device. The server may store, in a database, information (e.g., open time information) on that the door is opened.

Accordingly, the electronic device may provide the state information of the door by transmitting specified information to the external device depending on the set condition, thereby selectively transmitting only the state information, which needs to be identified by the user, of the door.

Figure 3A:
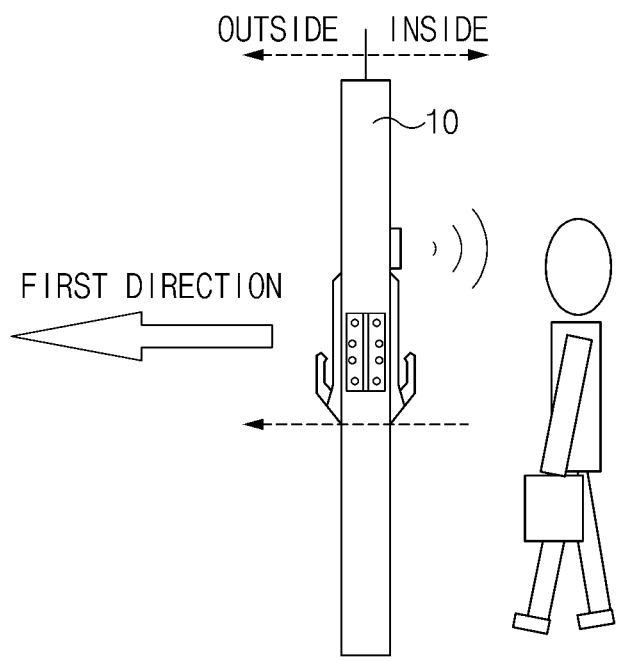
FIGS. 3A and 3B are views illustrating that a door installed with an electronic device is open, according to various embodiments of the disclosure.
Figure 3B:
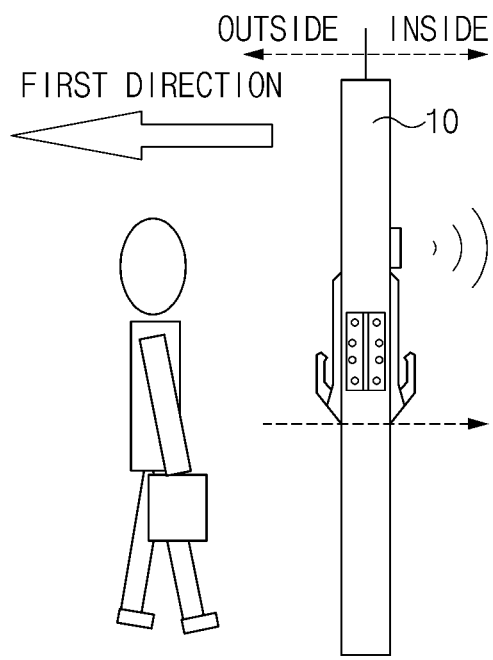

FIGS. 3A-3B are views illustrating that a door installed with the electronic device is open, according to various embodiments of the disclosure.

Referring to FIGS. 3A and 3B, the electronic device 100 may be installed on an inner surface of the door 10 to detect a state of the door 10. The door 10 may be, for example, opened in the first direction.

Referring to FIG. 3A, the electronic device 100 may sense an open state of the door 10 and may directly sense humans positioned at the inside to open the door 10 when a human opens the door 10 at the inside the space and moves to the outside, Accordingly, the electronic device 100 (or the server) may determine that the door 10 is opened from the inside, and store information on the open state of the door 10 in the database.

Referring to FIG. 3B, the electronic device 100 may sense an open state of the door 10 and may indirectly sense a human positioned at the outside to open the door 10, when the human opens the door 10 from the outside of the space and moves toward the inside, Accordingly, the electronic device 100 (or the server) may transmit the specified information to the external device 300 to provide, to the user, information on the open state of the door 10.

Figure 4:
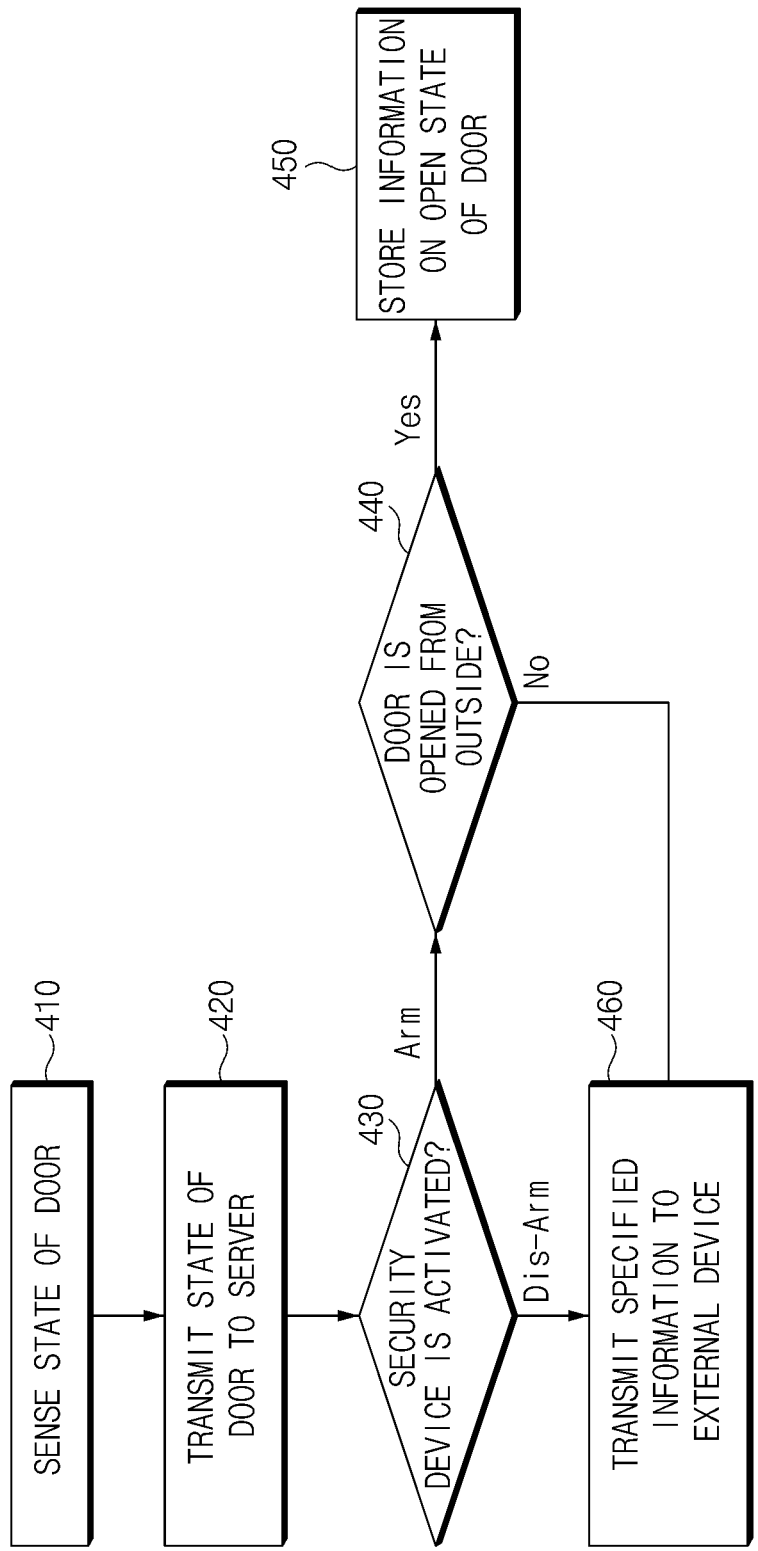
FIG. 4 is a view illustrating a method that an electronic device processes information on an open state of a door, according to an embodiment of the disclosure.

FIG. 4 is a view illustrating a method that an electronic device processes information on an open state of a door, according to an embodiment of the disclosure.

Referring to FIG. 4, the electronic device (e.g., the electronic device 100 of FIG. 1) may transmit specified information to an external device (e.g., the external device 300 of FIG. 1) based on the setting state of the security device, when a security device is installed, in the space in which the door (e.g., the door 10 of FIG. 1) is installed, to sense the external intrusion. The specified information may include, for example, information on an open state of a door or alarm information for notifying the external intrusion.

According to an embodiment, in operation 410, the electronic device (e.g., the processor 130 of FIG. 2) may sense a state of a door. For example, the electronic device may detect an open state of a door and a position of a human close to the door.

According to an embodiment, in operation 420, the electronic device may transmit information on the sensed state of the door to the server (e.g., the server 200 of FIG. 1).

According to an embodiment, in operation 430, the server may determine whether the security device installed in the space is activated.

According to an embodiment, when the security device is in a dis-arm state in which the security device is deactivated, the server may transmit the specified information to the external device (460). For example, the electronic device may transmit the specified information to the external device regardless of the position in which the door is opened.

According to an embodiment, in operation 440, when the security device is in an arm state in which the security device is activated, the server may determine the position at which the door is opened. For example, the server may determine the position at which the door is opened, based on the sensed open state of the door and the sensed position of the sensed human.

According to an embodiment, when it is determined that the door is opened from the inside (No), the server may transmit the specified information to the external device (460).

According to an embodiment, in operation 450, when it is determined that the door is opened from the outside (Yes), the server may store information on the open state of the door in a database.

In addition, the electronic device (or server) may provide, to the user, specified information in various situations set by the user as well as the above-described case. For example, when the security device is in the arm state and the door is opened from the inside, the electronic device may not transmit the specified information to the external device even if the door is opened from the inside. For example, when a user (e.g., a parent) sets the security device to be in the arm state in the state a human (e.g., a kid) is present inside a house, the electronic device may not transmit the specified information to the user even if the door is opened from the inside.

Accordingly, when it is determined, through the server, that the security device is in the arm state in which the security device is activated and the door is opened from the inside or outside, or when it is determined that the security device is in the dis-arm state in which the security device is deactivated and the door is opened from the outside, the electronic device may transmit the specified information to the external device.

According to another embodiment, the electronic device may determine a position at which the door is opened, based on state information of the door without passing through the server. According to an embodiment, as described above, the electronic device may transmit, to the external device, specified information depending on the state (e.g., the arm state or dis-arm state) of the security device installed in the space.

Figure 5:
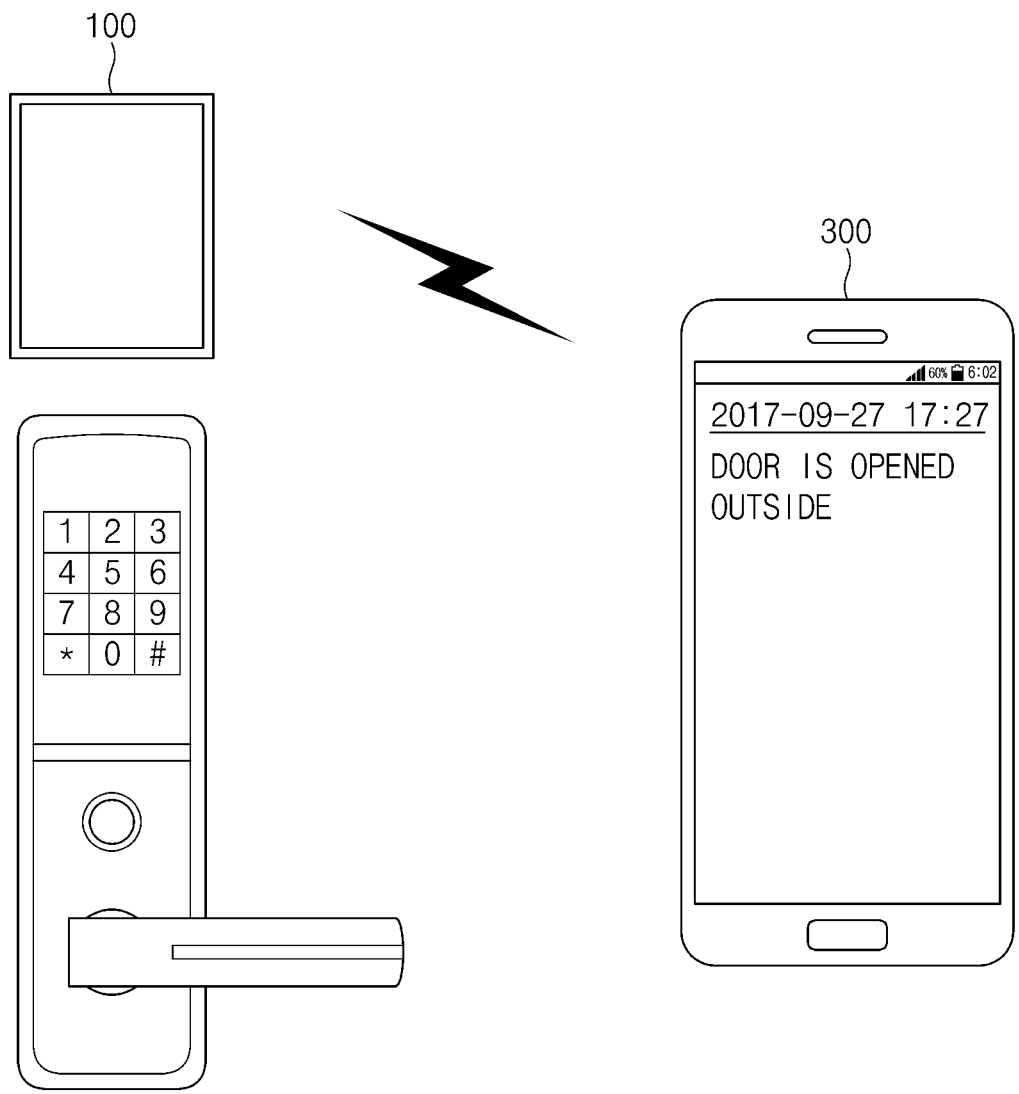
FIG. 5 is a view that information on an open state of a door, which is transmitted from an electronic device, is displayed on an external device, according to an embodiment of the disclosure.

FIG. 5 is a view illustrating that information, which is transmitted from an electronic device, on the open state of a door is displayed on the external device, according to an embodiment of the disclosure.

Referring to FIG. 5, the electronic device 100 may transmit, to the external device 300 (e.g., the mobile device), information on the open state of the door (e.g., the door 10 of FIG. 1).

According to an embodiment, the electronic device 100 may transmit information on the open state of the door to the external device 300, based on the position at which the door is opened, through a server (e.g., the server 200 of FIG. 1). For example, when it is determined that the door is opened from the outside through the server, the electronic device 100 may transmit the state information of the door to the external device 300.

According to an embodiment, the external device 300 may receive information on the opened state of the door. According to an embodiment, the external device 300 may display, on a display, the received information on the opened state of the door. The information on the open state of the door may include, for example, information on a date on which the door is opened and information on a time point at which the door is opened.

Accordingly, the electronic device 100 may transmit necessary information on the open state of the door to the user of the external device 300.

Figure 6:
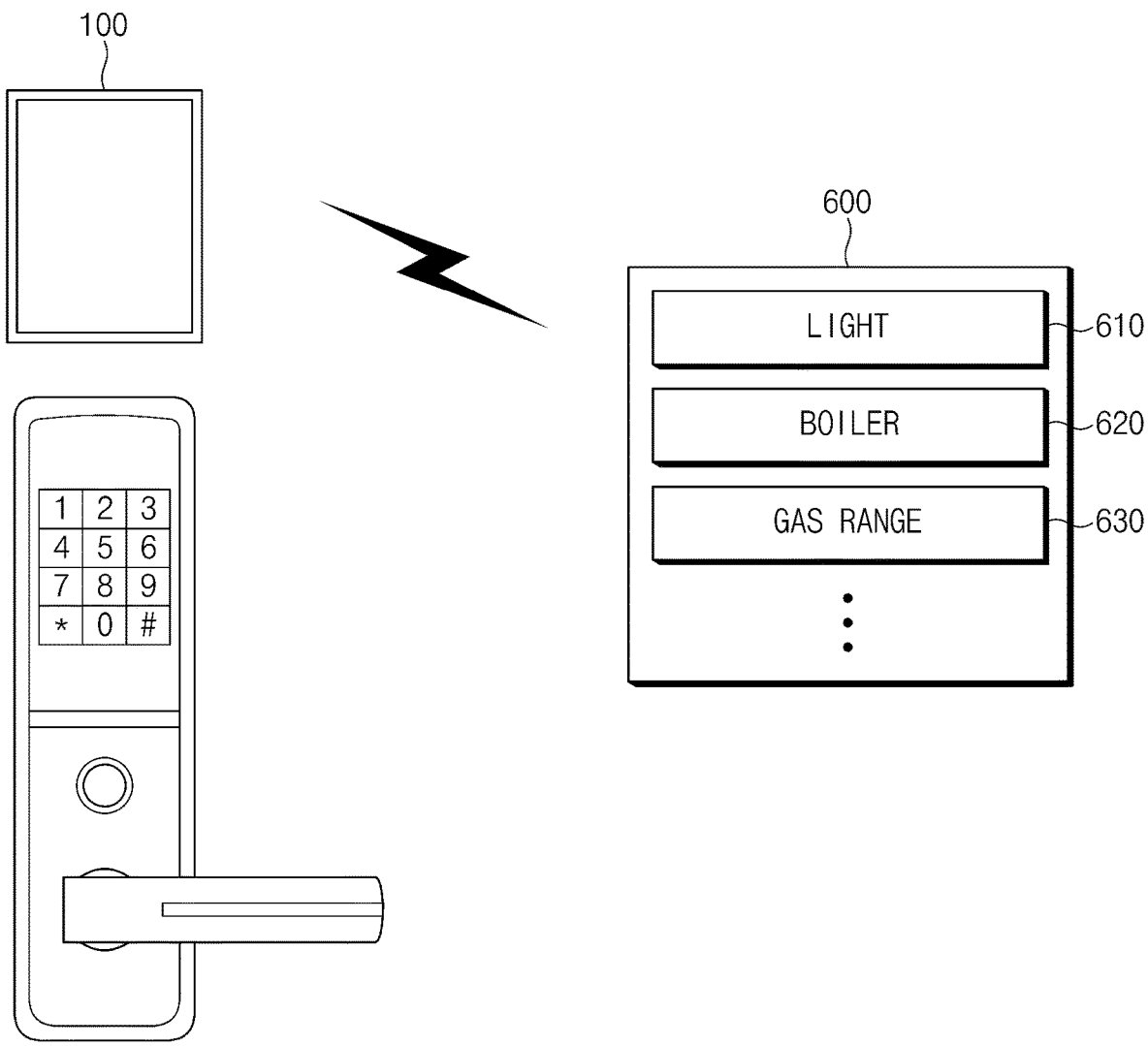
FIG. 6 is a view illustrating that an IoT device is controlled using information, which is transmitted from an electronic device, on an open state of a door, according to an embodiment of the disclosure.

FIG. 6 is a view illustrating that an IoT device is controlled based on information, which is transmitted from an electronic device, on an open state of a door, according to an embodiment of the disclosure.

Referring to FIG. 6, the electronic device 100 may transmit, to the IoT device 600, a request for changing a state based on the information on the open state of the door (e.g., the door 10 of FIG. 1). The IoT device 600 may include, for example, a light 610, a boiler 620, and a gas stove 620.

According to an embodiment, the electronic device 100 may transmit, to the IoT device 600, the request for changing the state, based on the position at which the door is opened, through a server (e.g., the server 200 of FIG. 1). For example, the electronic device 100 may transmit the request for changing the state of a power supply (e.g., on/off state) to the IoT device 600, based on the position at which the door is opened, through the server. According to an embodiment, the electronic device 100 may transmit mutually different control signals to each device included in the IoT device 600.

Accordingly, the electronic device 100 may control the IoT device 600 based on the information on the position at which the door is opened.

Figure 7:
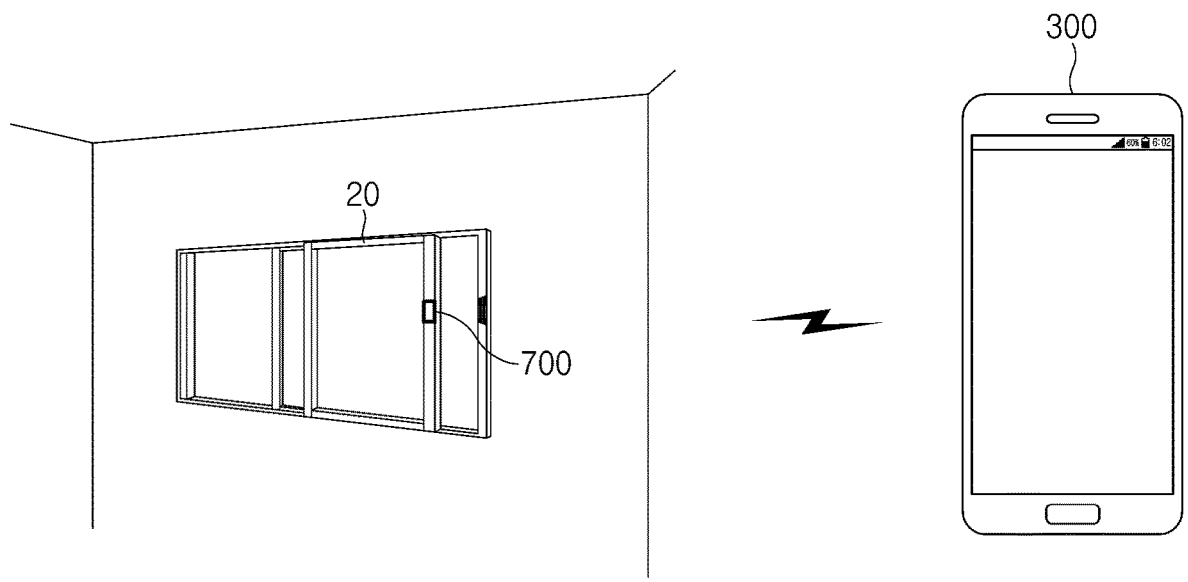
FIG. 7 is a view illustrating that an electronic device is installed on a window, according to an embodiment of the disclosure.

FIG. 7 is a view illustrating that an electronic device is installed on a window, according to an embodiment of the disclosure.

Referring to FIG. 7, an electronic device 700 may be installed on a window 20. For example, the electronic device 700 may be installed on at least one of an inner surface and an outer surface of the window 20. The inner surface may be a surface positioned inside a space (e.g., a house) in which the window 20 is installed and the outer surface may be a surface positioned at the outside of the space. The window 20 may, for example, be opened by a human positioned at the inside or outside of the space. The window 20 may be open in a sliding manner.

According to an embodiment, the electronic device 700 may be similar to the electronic device 100 of FIG. 1. For example, the electronic device 700 may include a sensor and a processor to sense an open/closed state of the window 20 and a human close to the window 20.

According to an embodiment, the electronic device 700 may sense an open/closed state of the window 20 and a human close to the window 20. According to an embodiment, the electronic device 700 may transmit the sensed information on the state of the window 20 to the server (e.g., the server 200 of FIG. 1). According to an embodiment, the server may receive information on the state of the window 20, and determine whether the window 20 is opened from the inside or outside based on the received information on the state of the window 20.

According to an embodiment, when it is determined that the window 20 is opened from the outside, the server 200 may transmit information on the open state of the window 20 to the external device 300. For example, the case that the window 20 is opened from the outside may indicate the intrusion of an outsider. Accordingly, it is necessary to provide the information on the open state of the window 20 to the user.

According to an embodiment, the electronic device 700 may sense the movement of the window 20. For example, the electronic device 700 may sense the movement of the window 20 through a sensor. The sensor may include, for example, an acceleration sensor to sense the movement of the window 20.

According to an embodiment, the electronic device 700 may determine whether the window 20 in the open state is further opened from the outside or inside of the space, based on the movement of the window and the position of the human, through the server. According to an embodiment, the electronic device 700 may transmit the specified information to the external device 300 through the communication circuit based on the position at which the window is further opened.

Accordingly, the electronic device 700 may transmit the specified information to the external device 300 depending on the position at which the window 20 is opened.

According to various embodiments described with reference to FIGS. 1 to 7, the electronic devices 100 and 700 may sense a human positioned inside or outside the space using the sensor installed in the door, thereby more simply determine the open position of the door as well as the open state of the door. Accordingly, the electronic device may provide, to the user, various services to transmit only necessary information to the user and to control the state of a house hold Internet of Things (JOT) device depending on the determined state.

Figure 8:
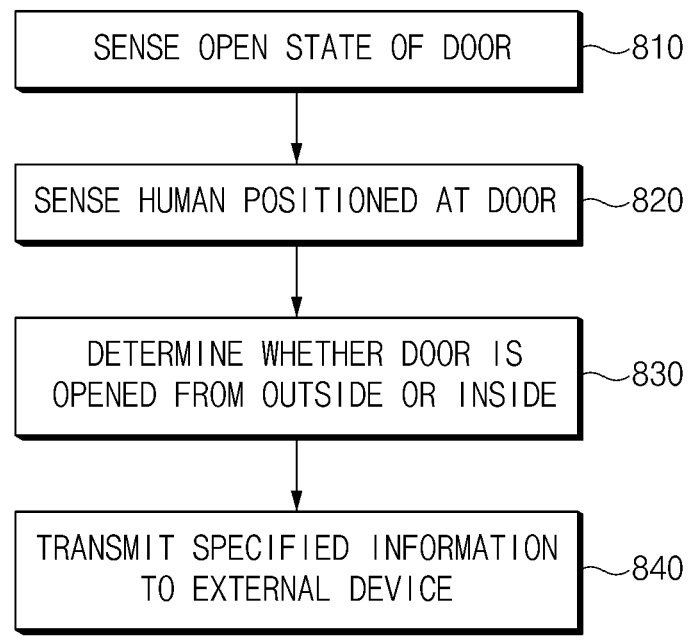
FIG. 8 is a view illustrating a method for controlling an electronic device, according to various embodiments of the disclosure.

FIG. 8 is a flowchart illustrating a method for controlling an electronic device according to various embodiments of the disclosure.

The flowchart of FIG. 8 may include operations processed by the above-described electronic device. Therefore, although omitted below, the description on the electronic device made with reference to FIGS. 1 to 7 may be applied to the flowchart illustrated in FIG. 8.

According to an embodiment, in operation 810, the electronic device (e.g., the electronic device 100 of FIG. 1) may sense the open state of the door through the sensor.

According to an embodiment, in operation 820, the electronic device may sense, through the sensor, a human close to the door and positioned in at least one of the inside and the outside of the space in which the door is provided.

According to an embodiment of the disclosure, in operation 830, the electronic device may determine whether the door is opened from the outside or inside of the space based on the sensed open state of the door and the sensed position of the door. For example, the electronic device may determine whether the door is opened from the outside or inside the space through a server (e.g., the server 200 of FIG. 1).

According to an embodiment, in operation 840, the electronic device may transmit the specified information to the external device based on the position at which the door is open. The specified information may include, for example, information on the open state of the door outside or alarm information for notifying the external intrusion.

Figure 9:
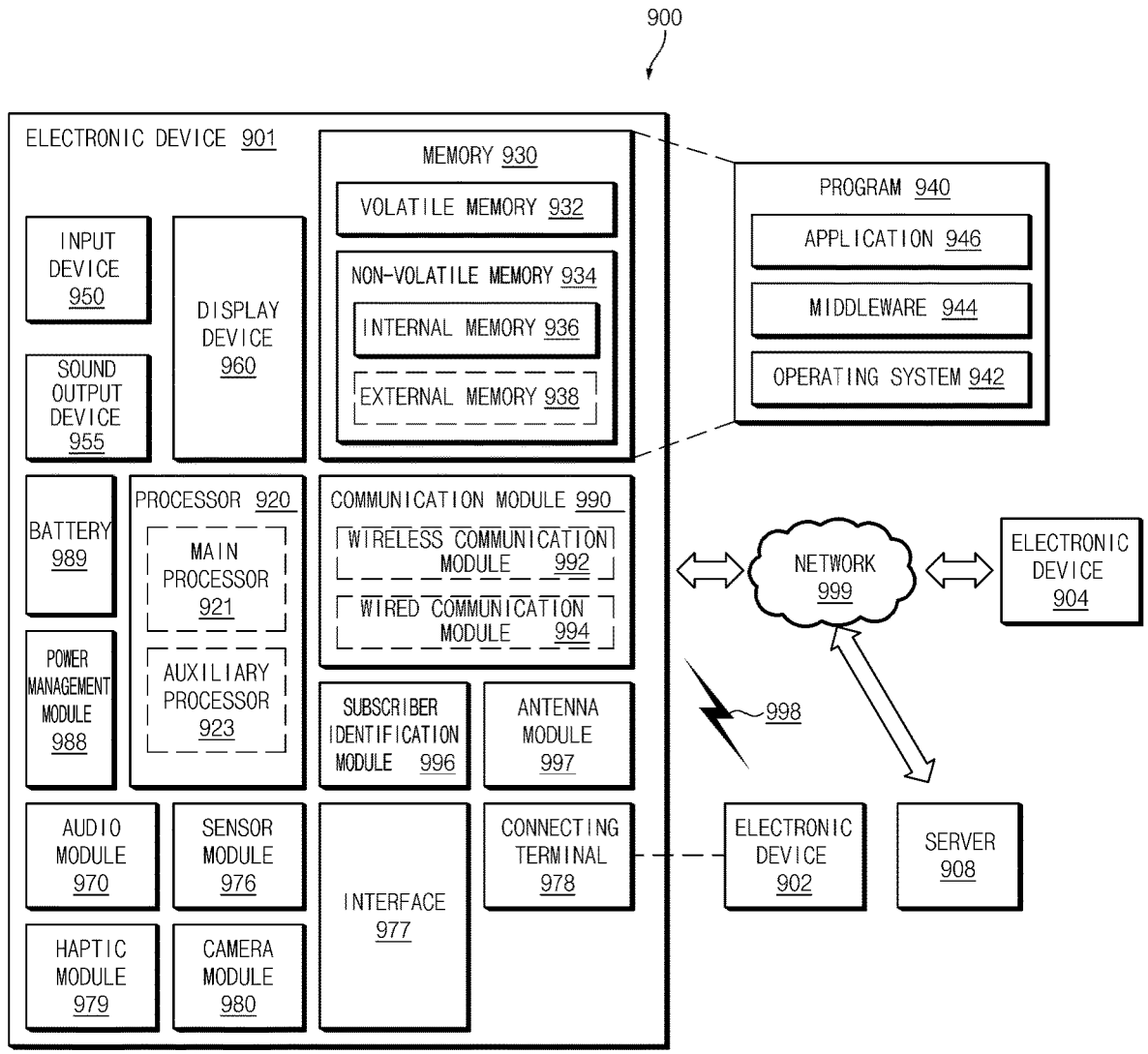
FIG. 9 is a block diagram of an electronic device in a network environment according to various embodiments.

FIG. 9 is a block diagram of an electronic device in a network environment according to various embodiments.

Referring to FIG. 9, an electronic device 901 may communicate with an electronic device 902 through a first network 998 (e.g., a short-range wireless communication) or may communicate with an electronic device 904 or a server 908 through a second network 999 (e.g., a long-distance wireless communication) in a network environment 900. According to an embodiment, the electronic device 901 may communicate with the electronic device 904 through the server 908. According to an embodiment, the electronic device 901 may include a processor 920, a memory 930, an input device 950, a sound output device 955, a display device 960, an audio module 970, a sensor module 976, an interface 977, a haptic module 979, a camera module 980, a power management module 988, a battery 989, a communication module 990, a subscriber identification module 996, and an antenna module 997. According to some embodiments, at least one (e.g., the display device 960 or the camera module 980) among components of the electronic device 901 may be omitted or other components may be added to the electronic device 901. According to some embodiments, some components may be integrated and implemented as in the case of the sensor module 976 (e.g., a fingerprint sensor, an iris sensor, or an illuminance sensor) embedded in the display device 960 (e.g., a display).

The processor 920 may operate, for example, software (e.g., a program 940) to control at least one of other components (e.g., a hardware or software component) of the electronic device 901 connected to the processor 920 and may process and compute a variety of data. The processor 920 may load a command set or data, which is received from other components (e.g., the sensor module 976 or the communication module 990), into a volatile memory 932, may process the loaded command or data, and may store result data into a nonvolatile memory 934. According to an embodiment, the processor 920 may include a main processor 921 (e.g., a central processing unit or an application processor) and an auxiliary processor 923 (e.g., a graphic processing device, an image signal processor, a sensor hub processor, or a communication processor), which operates independently from the main processor 921, additionally or alternatively uses less power than the main processor 921, or is specified to a designated function. In this case, the auxiliary processor 923 may operate separately from the main processor 921 or embedded.

In this case, the auxiliary processor 923 may control, for example, at least some of functions or states associated with at least one component (e.g., the display device 960, the sensor module 976, or the communication module 990) among the components of the electronic device 901 instead of the main processor 921 while the main processor 921 is in an inactive (e.g., sleep) state or together with the main processor 921 while the main processor 921 is in an active (e.g., an application execution) state. According to an embodiment, the auxiliary processor 923 (e.g., the image signal processor or the communication processor) may be implemented as a part of another component (e.g., the camera module 980 or the communication module 990) that is functionally related to the auxiliary processor 923. The memory 930 may store a variety of data used by at least one component (e.g., the processor 920 or the sensor module 976) of the electronic device 901, for example, software (e.g., the program 940) and input data or output data with respect to commands associated with the software. The memory 930 may include the volatile memory 932 or the nonvolatile memory 934.

The program 940 may be stored in the memory 930 as software and may include, for example, an operating system 942, a middleware 944, or an application 946.

The input device 950 may be a device for receiving a command or data, which is used for a component (e.g., the processor 920) of the electronic device 901, from an outside (e.g., a user) of the electronic device 901 and may include, for example, a microphone, a mouse, or a keyboard.

The sound output device 955 may be a device for outputting a sound signal to the outside of the electronic device 901 and may include, for example, a speaker used for general purposes, such as multimedia play or recordings play, and a receiver used only for receiving calls. According to an embodiment, the receiver and the speaker may be either integrally or separately implemented.

The display device 960 may be a device for visually presenting information to the user of the electronic device 901 and may include, for example, a display, a hologram device, or a projector and a control circuit for controlling a corresponding device. According to an embodiment, the display device 960 may include a touch circuitry or a pressure sensor for measuring an intensity of pressure on the touch.

The audio module 970 may convert a sound and an electrical signal in dual directions. According to an embodiment, the audio module 970 may obtain the sound through the input device 950 or may output the sound through an external electronic device (e.g., the electronic device 902 (e.g., a speaker or a headphone)) wired or wirelessly connected to the sound output device 955 or the electronic device 901.

The sensor module 976 may generate an electrical signal or a data value corresponding to an operating state (e.g., power or temperature) inside or an environmental state outside the electronic device 901. The sensor module 976 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 977 may support a designated protocol wired or wirelessly connected to the external electronic device (e.g., the electronic device 902). According to an embodiment, the interface 977 may include, for example, an HDMI (high-definition multimedia interface), a USB (universal serial bus) interface, an SD card interface, or an audio interface.

A connecting terminal 978 may include a connector that physically connects the electronic device 901 to the external electronic device (e.g., the electronic device 902), for example, an HDMI connector, a USB connector, an SD card connector, or an audio connector (e.g., a headphone connector).

The haptic module 979 may convert an electrical signal to a mechanical stimulation (e.g., vibration or movement) or an electrical stimulation perceived by the user through tactile or kinesthetic sensations. The haptic module 979 may include, for example, a motor, a piezoelectric element, or an electric stimulator.

The camera module 980 may shoot a still image or a video image. According to an embodiment, the camera module 980 may include, for example, at least one lens, an image sensor, an image signal processor, or a flash.

The power management module 988 may be a module for managing power supplied to the electronic device 901 and may serve as at least a part of a power management integrated circuit (PMIC).

The battery 989 may be a device for supplying power to at least one component of the electronic device 901 and may include, for example, a non-rechargeable (primary) battery, a rechargeable (secondary) battery, or a fuel cell.

The communication module 990 may establish a wired or wireless communication channel between the electronic device 901 and the external electronic device (e.g., the electronic device 902, the electronic device 904, or the server 908) and support communication execution through the established communication channel. The communication module 990 may include at least one communication processor operating independently from the processor 920 (e.g., the application processor) and supporting the wired communication or the wireless communication. According to an embodiment, the communication module 990 may include a wireless communication module 992 (e.g., a cellular communication module, a short-range wireless communication module, or a GNSS (global navigation satellite system) communication module) or a wired communication module 994 (e.g., an LAN (local area network) communication module or a power line communication module) and may communicate with the external electronic device using a corresponding communication module among them through the first network 998 (e.g., the short-range communication network such as a Bluetooth, a WiFi direct, or an IrDA (infrared data association)) or the second network 999 (e.g., the long-distance wireless communication network such as a cellular network, an internet, or a computer network (e.g., LAN or WAN)). The above-mentioned various communication modules 990 may be implemented into one chip or into separate chips, respectively.

According to an embodiment, the wireless communication module 992 may identify and authenticate the electronic device 901 using user information stored in the subscriber identification module 996 in the communication network.

The antenna module 997 may include one or more antennas to transmit or receive the signal or power to or from an external source. According to an embodiment, the communication module 990 (e.g., the wireless communication module 992) may transmit or receive the signal to or from the external electronic device through the antenna suitable for the communication method.

Some components among the components may be connected to each other through a communication method (e.g., a bus, a GPIO (general purpose input/output), an SPI (serial peripheral interface), or an MIPI (mobile industry processor interface)) used between peripheral devices to exchange signals (e.g., a command or data) with each other.

According to an embodiment, the command or data may be transmitted or received between the electronic device 901 and the external electronic device 904 through the server 908 connected to the second network 999. Each of the electronic devices 902 and 904 may be the same or different types as or from the electronic device 901. According to an embodiment, all or some of the operations performed by the electronic device 901 may be performed by another electronic device or a plurality of external electronic devices. When the electronic device 901 performs some functions or services automatically or by request, the electronic device 901 may request the external electronic device to perform at least some of the functions related to the functions or services, in addition to or instead of performing the functions or services by itself. The external electronic device receiving the request may carry out the requested function or the additional function and transmit the result to the electronic device 901. The electronic device 901 may provide the requested functions or services based on the received result as is or after additionally processing the received result. To this end, for example, a cloud computing, distributed computing, or client-server computing technology may be used.

The electronic device according to various embodiments disclosed in the disclosure may be various types of devices. The electronic device may include, for example, at least one of a portable communication device (e.g., a smartphone), a computer device, a portable multimedia device, a mobile medical appliance, a camera, a wearable device, or a home appliance. The electronic device according to an embodiment of the disclosure should not be limited to the above-mentioned devices.

It should be understood that various embodiments of the disclosure and terms used in the embodiments do not intend to limit technologies disclosed in the disclosure to the particular forms disclosed herein; rather, the disclosure should be construed to cover various modifications, equivalents, and/or alternatives of embodiments of the disclosure. With regard to description of drawings, similar components may be assigned with similar reference numerals. As used herein, singular forms may include plural forms as well unless the context clearly indicates otherwise. In the disclosure disclosed herein, the expressions "A or B", "at least one of A or/and B", "A, B, or C" or "one or more of A, B, or/and C", and the like used herein may include any and all combinations of one or more of the associated listed items. The expressions "a first", "a second", "the first", or "the second", used in herein, may refer to various components regardless of the order and/or the importance, but do not limit the corresponding components. The above expressions are used merely for the purpose of distinguishing a component from the other components. It should be understood that when a component (e.g., a first component) is referred to as being (operatively or communicatively) "connected," or "coupled," to another component (e.g., a second component), it may be directly connected or coupled directly to the other component or any other component (e.g., a third component) may be interposed between them.

The term "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. For example, the "module" may include an application-specific integrated circuit (ASIC).

Various embodiments of the disclosure may be implemented by software (e.g., the program 940) including an instruction stored in a machine-readable storage media (e.g., an internal memory 936 or an external memory 938) readable by a machine (e.g., a computer). The machine may be a device that calls the instruction from the machine-readable storage media and operates depending on the called instruction and may include the electronic device (e.g., the electronic device 901). When the instruction is executed by the processor (e.g., the processor 920), the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

According to an embodiment, the method according to various embodiments disclosed in the disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components (e.g., the module or the program) may be integrated in one component and may perform the same or similar functions performed by each corresponding components prior to the integration. Operations performed by a module, a programming, or other components according to various embodiments of the disclosure may be executed sequentially, in parallel, repeatedly, or in a heuristic method. Also, at least some operations may be executed in different sequences, omitted, or other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device installed in a door, the electronic device comprising:
   a communication circuit;
   at least one sensor configured to detect an open or closed state of the door, and proximity of a human to the door;
   a processor electrically connected with the communication circuit and the at least one sensor; and a memory, electrically connected with the processor, storing instructions executable by the processor to cause the electronic device to:

detect that the door is in the open state through the at least one sensor;

detect a proximity of a human near the door, and a position of the human at one of an interior and an exterior of a space for which the door is provided, through the at least one sensor;

determine whether the door is opened from the exterior or the interior of the space, based on the detected open state of the door and the detected position of the human;

determine whether a security device installed in the space for which the door is provided is armed or disarmed; and transmit specified information to an external device based on a first determination of whether the door is opened from the exterior or the interior of the space and a second determination of whether the security device is armed or disarmed.

2. The electronic device of claim 1, wherein the instructions are further executable by the processor to:

determine that the door is opened from the exterior, when a state of the door is the open state and when the human positioned at the exterior of the space is sensed; and determine that the door is opened from the interior, when the state of the door is the open state and the human is positioned at the interior of the space.

3. The electronic device of claim 1, wherein the specified information includes information on a state in which the door is opened, and wherein the instructions causes the processor to:

transmit the specified information to the external device, when the door is determined as being opened from the exterior and the security device is determined as being armed.

4. The electronic device of claim 1, wherein the specified information includes information on a state in which the door is opened, and wherein the instructions cause the processor to:

transmit the specified information to the external device, when the door is determined as being opened from the interior and the security device is determined as being armed.

5. The electronic device of claim 1, wherein the specified information includes information on a state in which the door is opened, and wherein the instructions are further executable by the processor to:

transmit the specified information to the external device, when the door is determined as being opened from the exterior and the security device is determined as being disarmed.

6. The electronic device of claim 1, wherein the specified information includes information for providing a request for changing a state of the external device, and wherein the instructions causes the processor to:

change the state of the external device by transmitting the specified information to the external device based on the position at which the door is opened.

7. The electronic device of claim 6, wherein the request for changing the state of the external device is a request for changing power of the external device to be in an on/off state.

8. The electronic device of claim 6, wherein the external device is an Internet of Things (IoT) device.

9. The electronic device of claim 1, wherein the at least one sensor senses a human positioned at the interior of the space, wherein the instructions causes the processor to:

sense a human which is close to the door and positioned at the interior of the space, and wherein a human is recognized as being positioned at the door at the exterior of the space, when the door is in the open state and the human close to the door is not sensed.

10. The electronic device of claim 1, wherein the at least one sensor includes:

at least one of an acceleration sensor, a gyro sensor, and a magnetic sensor to sense the open state and the closed state of the door, and wherein the at least one sensor further includes:

an infrared (IR) sensor, a passive infrared sensor (PIR) sensor, and an ultrasonic sensor to sense the human.

11. An electronic device installed on a window, the electronic device comprising:

a communication circuit;

at least one sensor configured to detect an open or closed state of the window, and proximity of a human to the window;

a processor electrically connected with the communication circuit and the at least one sensor; and a memory electrically connected with the processor, storing instructions executable by the processor to cause the electronic device to:

detect that the window is in the open state of through the at least one sensor;

detect a proximity of a human near the window, and a position of the human at one of an interior and an exterior of a space for which the window is provided, through the at least one sensor;

determine whether the window is opened from the exterior or the interior of the space, based on the detected open state of the window and the detected position of the human;

determine whether a security device installed in the space for which the window is provided is armed or disarmed; and transmit specified information to an external device based on a first determination of whether the window is opened from the exterior or the interior of the space and a second determination of whether the security device is armed or disarmed.

12. The electronic device of claim 11, wherein the specified information includes information on a state in which the window is opened from the exterior, and wherein the instructions causes the processor to:

transmit the specified information to the external device based on at least one of a first situation in which the window is determined as being opened from the exterior and the security device is determined as being armed, a second situation in which the window is determined as being opened from the interior and the security device is determined as being armed or a third situation in which the window is determined as being opened from the exterior and the security device is determined as being disarmed.

13. The electronic device of claim 11, wherein the at least one sensor includes a sensor to sense movement of the window, and wherein the instructions causes the processor to:

sense the movement of the window through the at least one sensor in the state that the window is opened;

determine whether the window is further opened from the exterior or at the interior of the space, based on the sensed movement of the window and the detected position of the human; and transmit the specified information to the external device based on a position at which the window is further opened, through the communication circuit.

14. The electronic device of claim 13, wherein the at least one sensor includes an acceleration sensor to sense the movement of the window.

15. A method in an electronic device, the method comprising:

detecting that a door is in an open state through at least one sensor;

detecting, through the at least one sensor, proximity of a human near to the door, and a position of the human in one of an interior and an exterior of a space for which the door is provided;

determining, by at least one processor, whether the door is opened from the exterior or the interior of the space, based on the detected open state of the door and the detected position of the human;

determining whether a security device installed in the space for which the door is provided is armed or disarmed; and transmitting, through a communication circuit, specified information to an external device, based on a first determination of whether the door is opened from the exterior or the interior of the space and a second determination of whether the security device is armed or disarmed.

* * * * *